United States Patent [19]
Krebs

[11] Patent Number: 5,587,942
[45] Date of Patent: Dec. 24, 1996

[54] 3D WAVE EQUATION MIGRATION OF A 2D GRID OF SEISMIC DATA

[75] Inventor: Jerome R. Krebs, Houston, Tex.

[73] Assignee: Exxon Production Research Company, Houston, Tex.

[21] Appl. No.: 205,010

[22] Filed: Mar. 2, 1994

[51] Int. Cl.$^6$ ............................................. G01V 1/00
[52] U.S. Cl. ........................ 367/50; 367/53; 364/421
[58] Field of Search ........................ 367/50, 53, 38; 364/421

[56] References Cited

U.S. PATENT DOCUMENTS

| | | | |
|---|---|---|---|
| 4,611,312 | 9/1986 | Ikeda | 367/38 |
| 4,672,545 | 6/1987 | Lin et al. | 364/421 |
| 4,736,347 | 4/1988 | Goldberg et al. | 367/53 |
| 4,964,097 | 10/1990 | Wang et al. | 367/73 |
| 4,964,103 | 10/1990 | Johnson | 367/53 |
| 5,008,861 | 4/1991 | Gallagher | 367/38 |
| 5,067,113 | 11/1991 | Hanson et al. | 367/50 |
| 5,079,703 | 1/1992 | Mosher et al. | 364/421 |
| 5,079,749 | 1/1992 | Aminzadeh et al. | 367/38 |
| 5,153,857 | 10/1992 | Wang | 367/50 |
| 5,170,377 | 12/1992 | Manzur et al. | 364/421 |
| 5,198,979 | 3/1993 | Moorhead et al. | 364/421 |
| 5,229,940 | 7/1993 | Wang et al. | 364/421 |
| 5,233,569 | 8/1993 | Beasley et al. | 367/53 |
| 5,285,422 | 2/1994 | Gonzalez et al. | 367/53 |
| 5,309,406 | 5/1994 | Ongkiehong et al. | 367/38 |

OTHER PUBLICATIONS

Yilmaz, O., "Migration," in Seismic Data Processing, (Tulsa, SEG) 1987, pp. 241–277.

Morgan, T. R. and F. J. Hilterman, "Three–Dimensional Migration Velocity Analysis in the Space–Time and Space–Frequency Domains," 1985.

Primary Examiner—Michael J. Carone
Assistant Examiner—Theresa M. Wesson
Attorney, Agent, or Firm—Stephen P. Koch

[57] ABSTRACT

A method for three dimensional migration of a two dimensional grid of seismic data. The method involves computation of three dimensional time-dip functions at the intersections of lines in the grid. Inverse raytracing is used to correctly position the reflection events in the three dimensional volume encompassed by the grid. Migration of the seismic data is performed onto image surfaces defined from the correctly positioned reflection events.

17 Claims, 5 Drawing Sheets

3D WAVE EQUATION MIGRATION OF A 2D GRID OF SEISMIC DATA

FIELD OF THE INVENTION

The invention relates to the field of seismic imaging, particularly to the construction of accurate three dimensional images of subterranean formations from surface seismic data.

BACKGROUND OF THE INVENTION

In the oil and gas industry, seismic prospecting techniques are commonly used in the search for subterranean hydrocarbon deposits. An important step in this search is the construction of an image of a three dimensional (3-D) volume of the subsurface of the earth. In conventional seismic prospecting, the seismic data required to construct that image are acquired along a two dimensional (2-D) grid of shot lines. Typically, this grid lies on the surface of the earth. At each shot point in each line, an energy source generates seismic signals that propagate into the earth and are partially reflected by subsurface reflectors. The reflectors are interfaces between formations having different acoustic impedances and are often important features in the desired image. These reflections are recorded by seismic detectors on or near the surface of the earth or in the overlying body of water. Each line is processed independently, and a skilled interpreter can obtain a picture of the entire 3-D volume covered by the grid from the data associated with the individual lines.

The initial steps involving seismic data acquisition and processing are well known in the art. For each line, data from a multiplicity of source locations are recorded by a multiplicity of receivers. After preprocessing and deconvolution, the data are converted from shot-receiver to midpoint-offset coordinates. This conversion involves generation of Common Depth Point (CDP) gathers in which data from source-receiver combinations with the same midpoint are considered to have come from the same reflection point in the earth (the zero-offset point). The different source-receiver distance traces, referred to as offset traces, in a CDP gather are stacked together after correcting for different travel times to give a stacked trace that is an improved estimate of the zero-offset trace. The zero-offset trace is the trace which would be recorded by a receiver coincident with the source. The estimate is generated because subsequent processing procedures require knowledge of the zero-offset reflection point. However, a consequence of the structural complexity and subsurface seismic velocity variation along a typical seismic line is that the position of the stacked trace as recorded is usually an inaccurate estimate of the correct position of the reflection point. The process of moving the seismic data from the position where the data were recorded to the position from which the data originated is called migration.

With the arrival of modern high-speed digital computers, it is possible to perform the migration of a single line of seismic data (2-D migration) efficiently using accurate mathematical models of the propagation of seismic waves through the earth (2-D wave equation migration). The implicit assumption in 2-D migration is that all reflections originate in a vertical plane (the sagittal plane) passing though the line of acquisition. That assumption is valid only if the direction of the line of acquisition is the same as the dip direction of the reflecting horizon. It is not generally possible to satisfy this condition for all reflecting horizons for all lines in a grid of seismic data.

This limitation of 2-D migration led to the development of 3-D seismic data acquisition techniques in which a closely spaced grid of seismic lines is acquired. Using a 3-D model of seismic velocities in the volume covered by the grid, a 3-D wave equation migration can be performed to give an image of the subsurface. The image is better than the image obtained from 2-D migration because data from the entire 3-D grid of seismic lines is used, and because the assumption that reflections originate from the sagittal plane of the line of acquisition is eliminated.

However, the process of acquiring 3-D data and performing a full 3-D migration is expensive—as much as 100 times more than acquiring and migrating a sparse 2-D grid. In addition, it is not always possible to acquire 3-D data at many locations, such as in urban areas or sites with rough terrain. For these reasons, it is preferable to use a sparse grid of 2-D lines to get a 3-D image of the subsurface whenever possible.

One approach that has been used for migrating a 2-D grid of data is map migration. In this method, reflecting horizons on each of the seismic lines are selected, and a contour map showing reflection times to the horizons is produced by a skilled interpreter. Finally, using a 3-D model of subsurface velocities, the contour maps are migrated to give a 3-D depth map of the various horizons. This three step process is labor-intensive, however, and much of the detailed information that is present in the original seismic data is lost during the migration. Because that detailed information can be important in determining the presence of hydrocarbon reservoirs, difficulties in interpretation of the resulting depth map can result.

In order to preserve this detailed information, approaches have been proposed that use the entire set of seismic data in place of map migration. U.S. Pat. No. 5,079,703 to Mosher and Thompson begins with an irregular 2-D grid and, using a 3-D velocity model, produces migrated data on a regular 3-D grid. For each output point, data from each of the lines in the 2-D grid are migrated twice—first along the line and second at a right angle to it. This process, called D-2D migration, does not produce the same result as a full 3-D migration because incorrect velocities are used in the first migration step. To perform the D-2D migration properly, each of the steps must be carried out using the velocity of the final migrated position of the output point. However, because that position is initially an unknown, the first migration is performed using the velocity of the in-line migrated position. Since this point is generally deeper than the final migrated output point (for a migration velocity that increases with depth), the assumed velocity is too high. This limitation of D-2D migration is well known to practitioners of the art.

U.S. Pat. No. 4,672,545 to Lin and Holloway uses time-dip measurements from 2-D lines to estimate 3-D time-dips. The output is obtained by a linear interpolation, along time-dip surfaces, of data from the surrounding 2-D lines. The result of this procedure is an interpolation-based 3-D data set that can be migrated with a 3-D wave equation migration program. The procedure breaks down in structurally complex areas where more than one time-dip on any line at a given reflection time may be present. Furthermore, after migration the interpreter cannot distinguish reliable measured data from less reliable interpolated data.

U.S. Pat. No. 4,964,097 to Wang, Hanson and Cavanaugh ("Wang") is a method for taking a subset of a grid of 3-D data and producing a 3-D velocity model using 2-D depth images and iterative ray tracing. The ray tracing solves the problem of conflicting dips that arises in methods that rely on linear interpolation. This 3-D velocity model may be the desired product or may be used for a full 3-D migration of the complete grid of 3-D data. Wang does not address the problem of migrating a sparse grid of 2-D data.

From the foregoing, it can be seen that there is a need for a method of 3-D migration of a sparse, possibly irregular, grid of 2-D seismic data that places the seismic horizons in their correct spatial position while retaining the data's detailed structural and stratigraphic information. The present invention satisfies these needs.

SUMMARY OF THE INVENTION

The present invention overcomes the above described limitations of previous methods of migrating a 2-D grid of seismic lines by using inverse ray tracing to guide a 3-D migration of the 2-D seismic grid. 3-D time-dips are measured as a function of time at the intersection points of the 2-D seismic grid. Inverse ray tracing of the time-dips defines a 3-D surface for each line which contains the reflection points for the line. These surfaces are called imaging surfaces. 3-D migration is used to produce a migrated image of data from the 2-D line onto the 3-D imaging surfaces.

The 3-D migrated images on the imaging surfaces tie at the intersections of the imaging surfaces of the individual lines, and can be interpreted using 3-D visualization techniques.

The resulting images will have the same 3-D accuracy that would result from map migration. However, the images retain all the detail present in the seismic data that is lost in map migration. Because no interpolation is required, and because the migration is only performed onto the imaging surfaces, the process automatically extracts only those portions of the image that are reliably migrated. The image is superior to that obtained by conventional 2-D wave equation migration of the 2-D grid of lines because reflections are correctly positioned in 3-D. Another advantage is that the migration is performed with a 3-D velocity model rather than with separate, often inconsistent, 2-D velocity models for each line.

BRIEF DESCRIPTION OF THE DRAWINGS

The present invention and its advantages will be more easily understood by reference to the following detailed description and the attached drawings in which.

While the invention will be described in connection with its preferred embodiments, it will be understood that the invention is not limited thereto. On the contrary, it is intended to cover all alternatives, modifications, and equivalents that may be included within the spirit and scope of the invention, as defined by the appended claims.

DETAILED DESCRIPTION OF THE PREFERRED EMBODIMENTS

The present invention is a method for accurately producing images of a 3-D volume of the subsurface of the earth from a grid of partially intersecting 2-D lines. The lines of the grid may be irregular, i.e., not form a rectangular grid, and may be spaced a considerable distance apart. For these reasons, the invention may be used to migrate data for which more costly 3-D migration techniques cannot be used.

Figure 1:
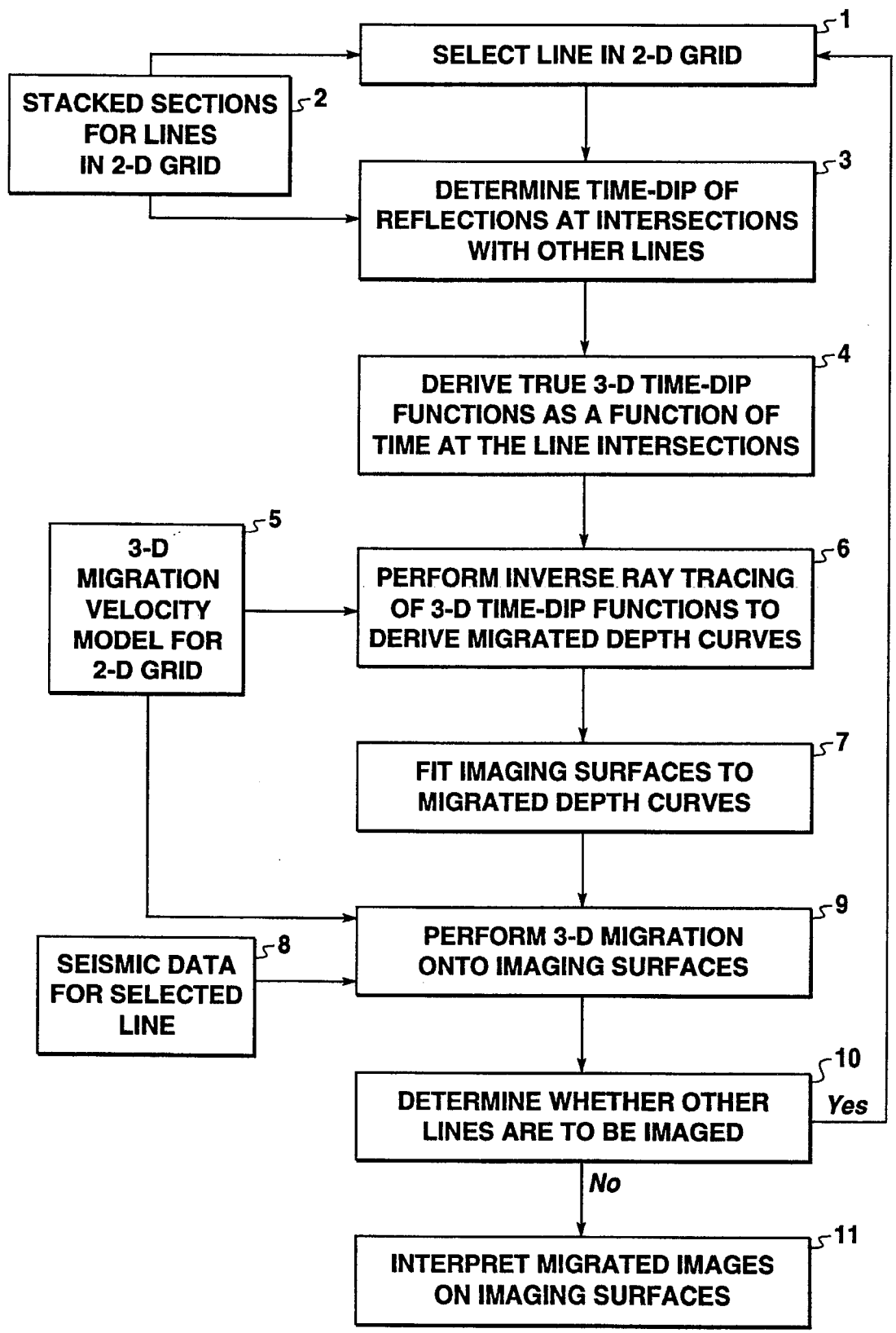
FIG. 1 schematically illustrates the steps required to implement the present invention.
Figure 2:
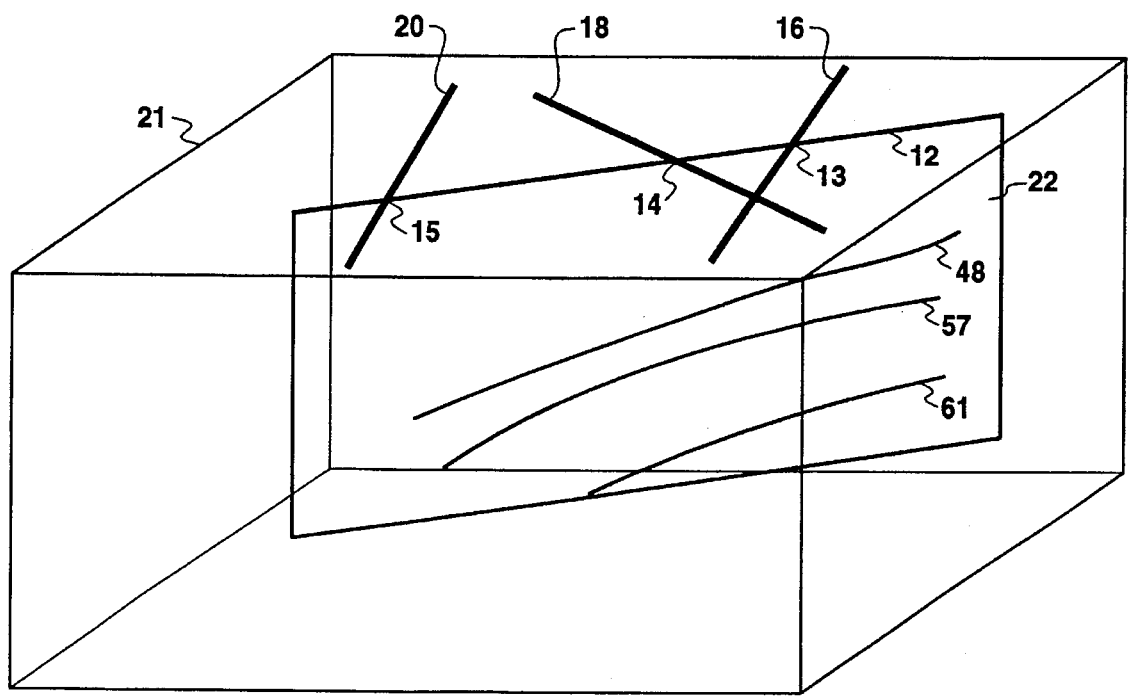
FIG. 2 shows a perspective view of a grid of seismic lines and the reflection events in the stacked section of one of the lines.

FIG. 1 depicts a flowchart of the steps of a first embodiment of the present invention. The characteristics of the seismic grid to which these steps are directed are graphically illustrated in FIGS. 2, 3, 4 and 5. Specifically, FIG. 2 depicts a perspective view of 3-D volume 21 of the earth. A 2-D grid of four seismic lines 12, 16, 18, and 20 are shown for purposes of illustration; in practice, there would usually be many more lines. Sagittal plane 22 extends below line 12. The intersections of three horizons with sagittal plane 22 are depicted by curves 48, 57 and 61. These 2-D curves represent reflection events present in the CDP stack of seismic data from line 12. The horizons are 3-D features within volume 21; however, and it is an object of the present invention to develop accurate 3-D characterizations of the horizons using the 2-D reflection event curves which are present in the stacked seismic data. Line 12 has intersections 13, 14, and 15 with lines 16, 18, and 20, respectively.

Figure 3:
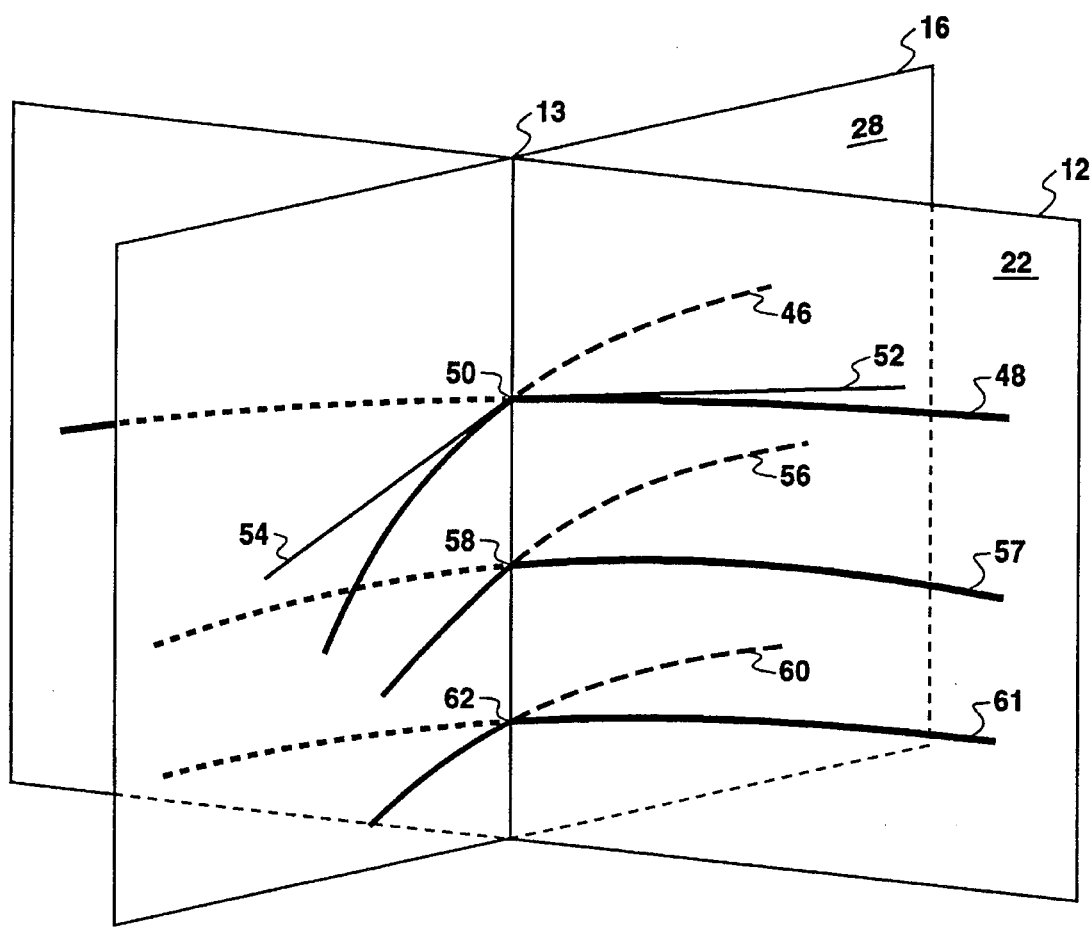
FIG. 3 shows a perspective view of the sagittal planes of two intersecting lines from FIG. 2 and the reflection events in the stacked sections for those lines.

A perspective view of the sagittal planes corresponding to lines 12 and 16 from FIG. 2 is reproduced in FIG. 3. The horizons which generated curves 48, 57, and 61 are represented in the stacked data from line 16 by curves 46, 56, and 60. For purposes of illustration, curves 46 and 48 are assumed to derive from the same 3-D horizon within volume 21. However, until all steps of the present invention are completed, insufficient information is available to confirm that assumption or to otherwise determine the nature of the three dimensionality of that horizon. Similarly, curves 56 and 57 result from a second horizon within volume 21, and curves 60 and 61 from a third horizon. The three pairs of curves in this illustration intersect at 50, 58, and 62, respectively.

The first step 1 in FIG. 1 is to choose one of the lines of the 2-D seismic grid, for example 12 in FIG. 2. Common Depth Point (CDP) stacks of the lines in the grid will have been previously generated (2 in FIG. 1). In addition, seismic velocities for the lines will have been computed and combined to produce a 3-D velocity model (5 in FIG. 1). A number of methods of producing that model exist, including the method of Wang and the method in copending U.S. patent application Ser. No. 08/097,817 of Krebs.

At each of the intersections of the selected line with other lines of the seismic grid (13, 14, and 15 in FIG. 2), the time and time-dip of the reflection events of interest are measured from the CDP stack of the chosen line (step 3 in FIG. 1). These measurements use a temporal coordinate reference, since, as is well known to those skilled in the art, reflection events for any given seismic line are referenced in time coordinates below that line (i.e., time increases in the vertically downward direction). Only after velocity analysis and migration are performed can reference be made to spatial units. In FIG. 3 for example, curves 48 and 46, can be considered to intersect at time 50. The time-dip along curve 48 at time 50 is determined by drawing line 52 tangent to curve 48 at time 50 and within sagittal plane 22, and determining the slope of line 52. Similarly, the time-dip of curve 46 is determined from the slope of line 54, which is tangent to curve 46 at time 50 and which is in sagittal plane 28. The time-dips of curves 46 and 48 at time 50 are combined in step 4 of FIG. 1 to give the 3-D time dip of the first horizon at time 50. This procedure is repeated at all intersections of all lines for all horizons of interest in the seismic grid. The procedure may be performed manually, by computer program or by a combination of manual and computer analysis. The result for each intersection of the seismic lines is a set of 3-D time dip values tabulated as a function of time.

The components of time-dip at the possibly non-orthogonal line intersections are geometrically combined in step 4 of FIG. 1 to give a true 3-D time-dip function as a function of time along the chosen line. These time-dip functions, which are algebraic expressions having 3-D time-dip as the dependent variable and time as the independent variable, are useful for developing migrated depth curves, but do not have a visual representation. For that reason, they are not depicted in FIG. 3. Individual time-dip functions are derived for each intersection (13, 14, and 15 of FIG. 2) of the surface seismic lines. The functions characterize time-dip in smoothly varying expressions which are a function of traveltime, but do not directly contain any other information about the nature of the horizons or other data in the seismic lines. The analysis required to fit algebraic expressions to tabulated 3-D time-dip values will be well known to those skilled in the art.

Certain geophysical datasets may require that multiple time-dip functions be selected at one or more line intersections. This would result, for example, if geological complications result in irregularly varying time-dip functions at a line intersection, and may be required to develop a correct spatial reference of the subsurface features. The analysis required to determine that multiple time-dip functions are necessary at a line intersection will be known to those skilled in the art.

The 3-D velocity model, 5 in FIG. 1, is used in step 6 of FIG. 1 to obtain a 3-D migrated depth curve for each of the 3-D time-dip functions. Map migration, which is sometimes referred to as kinematic migration, is used to derive the depth curves. One possible method of performing that migration, using a process of zero-offset inverse ray-tracing in the 3-D velocity model, is as follows: Knowing the time-dip and surface velocity, the emergence angle of the reflection raypath is calculated. Using that emergence angle, a raypath having a traveltime equal to the measured traveltime of the reflection is traced from the surface through the 3-D velocity model. The end of this raypath is the migrated position of the reflection. This process ensures that the reflection points for each of the line intersections are correctly positioned in the 3-D volume. Prior art techniques, such as D-2D migration, do not provide correct 3-D positioning of the reflection points. This inverse ray-tracing process, as well as other methods of deriving migrated depth curves, will be familiar to those skilled in the art.

Figure 4:
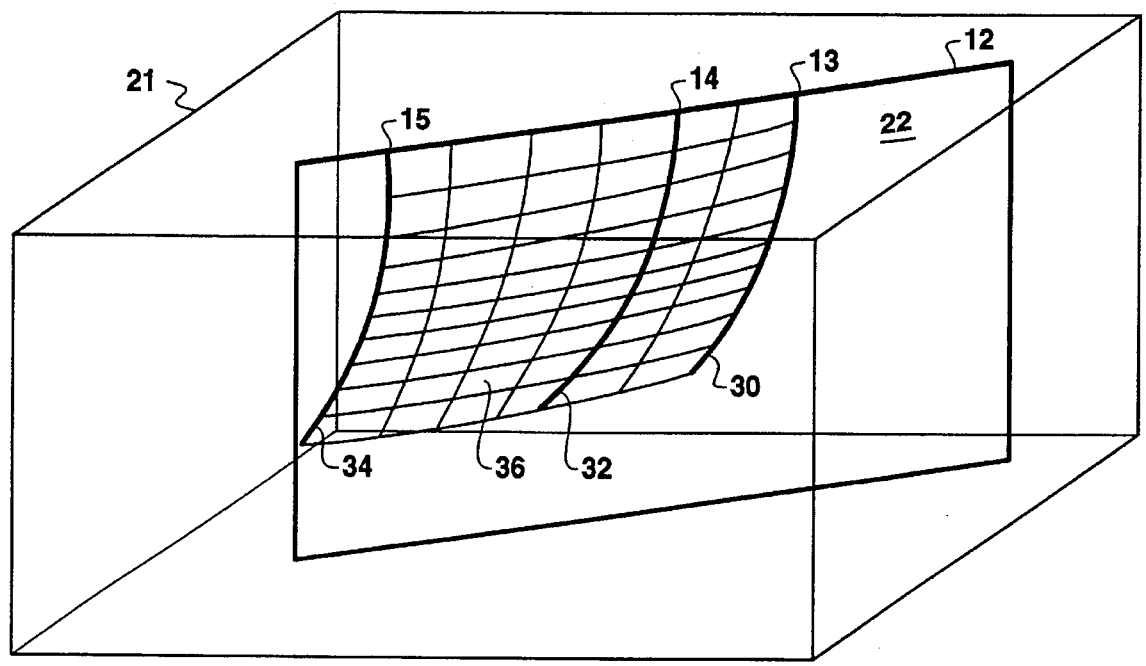
FIG. 4 shows a perspective view of a 3-D imaging surface constructed from the migrated depth curves for one of the lines of FIG. 3.

The migrated depth curves, shown as 30, 32 and 34 in FIG. 4, provide a correct spatial reference of the structural features within the 3-D volume, but do not retain the seismic detail present in the original data. However, the migrated depth curves are used in step 7 of FIG. 1 to define an imaging surface which can be used for a subsequent 3-D migration which will retain that seismic data. The imaging surface (36 in FIG. 4) is a surface in the 3-D volume from which seismic reflections were recorded on the selected seismic line. More than one surface may be defined for a given seismic line as for example where multiple time-dip functions are necessary at the line intersections. The process of fitting a surface that passes through a number of curves will be familiar to those skilled in the art.

At this point, in step 9 of FIG. 1, a full 3-D wave equation migration of the seismic data 8 from the line is carried out using the 3-D migration velocity model 5. An image is then extracted along the imaging surface from this 3-D migrated volume. In the preferred embodiment, a 3-D Kirchoff migration directly onto the imaging surface is performed. This embodiment eliminates the extraction step. Either prestack or poststack migration may be employed, depending on the goals of the analysis and the computer resources available. Other suitable migration techniques will be known to those skilled in the art.

Imaging surface 36 will generally be non-planar, in contrast to sagittal plane 22, which is planar. This non-planar characteristic of imaging surface 36 is one of the advantages of the present invention over the prior art. In the absence of 3-D information, the prior art assumes that all reflections arise from the sagittal plane. As a result, the seismic detail obtained from migration is placed in the plane in prior art techniques. In the present invention, the 3-D migration places the seismic detail on the non-planar image surface, thereby eliminating the in-plane reflection assumption. When all image surfaces have been migrated and appropriate 3-D visualization techniques have been applied, the result is an improved estimate of the three dimensional structure of the 3-D volume.

In step 10 another line in the grid is selected for analysis, if desired, and the entire process is repeated. Step 11 in FIG. 1, interpretation of the migrated images, is performed when all lines of interest have been analyzed. 3-D visualization techniques that correctly display the seismic data rendered in three dimensions on the imaging surfaces are commercially available. For example, the IREX visualization software marketed by Dynamic Graphics Inc. of Alameda, Calif. could be used.

The steps in FIG. 1 are depicted in a demonstrative order which is not to be interpreted as limiting. For example, it is not necessary to complete the 3-D migration in step 9 prior to determining whether other lines are to be imaged (step 10). The depth curves for all lines in the grid could first be derived (step 6), followed by a fitting of image surfaces to the depth curves for each of the lines (step 7) and the 3-D migration of the seismic data onto the imaging surfaces (step 9). In that example the determination shown in step 10 would be made between step 6 and step 7. Other modifications of the order in which the steps of the present invention may be carried out will be apparent to those skilled in the art.

In the preferred embodiment, the migrated images are only calculated on the imaging surfaces, thus eliminating the image extraction step. Because the entire seismic data set is used in the migration, the details of structure and stratigraphy necessary for correct interpretation of the subsurface is preserved. The use of the 3-D migration velocity model ensures that the data will be migrated to the correct spatial position, an advantage over prior art 2-D and 3-D migration schemes.

Figure 5:
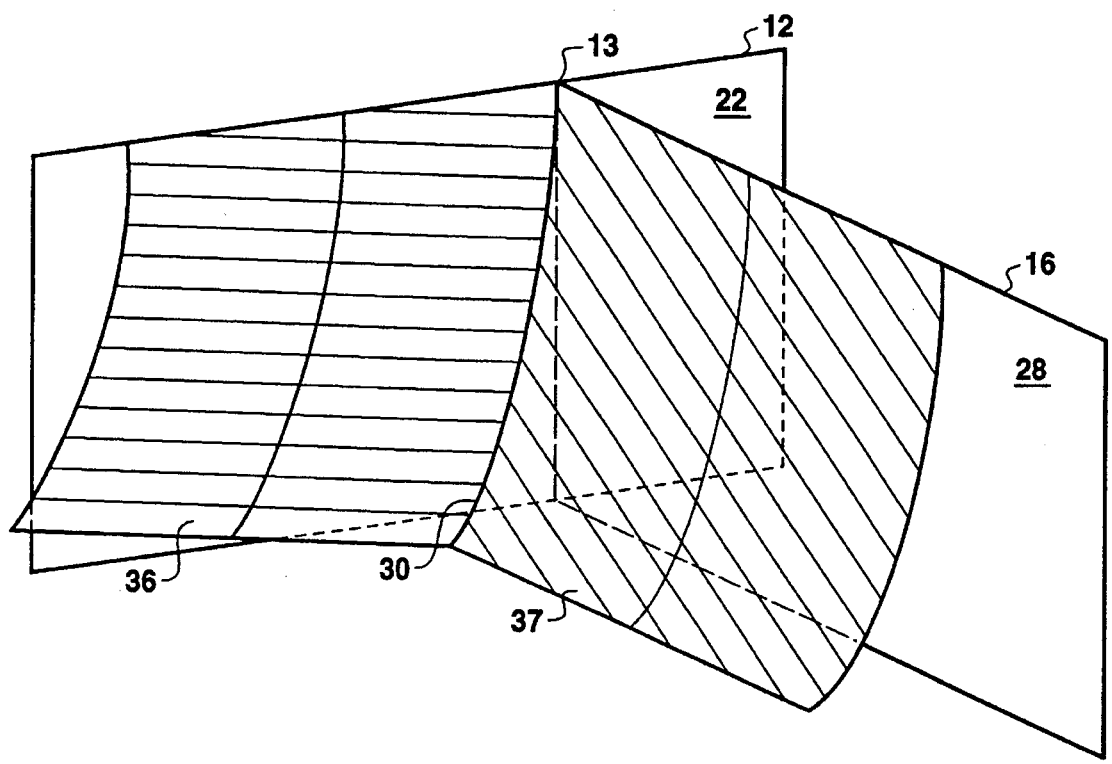
FIG. 5 shows a perspective view of the intersecting 3-D imaging surfaces for the two intersecting lines in FIG. 3.

By 3-D migrating the 2-D seismic grid onto the imaging surfaces, the procedure ensures that the seismic data will tie at the line intersections. This advantage of the present invention is depicted in FIG. 5, where imaging surface 36 derives from the depth curves from line 12 and imaging surface 37 derives from the depth curves from line 16.

Because the time-dip functions derived in step 4 of FIG. 1 rely on time-dip information from both line 12 and line 16, the imaging surfaces tie along curve 30. For the same reason, both imaging surfaces are three-dimensional and the depth curve defining the intersection of the surfaces will not generally fall directly below intersection 13 of lines 12 and 16. Instead, that curve is correctly positioned spatially, and, after the 3-D migration along each of the imaging surfaces, the seismic data will be both correctly positioned spatially and will tie along the intersection. Prior art techniques, including those techniques which determine time-dips at the line intersections, do not have the ability to tie seismic data from individual lines. This prior art limitation results from the fact that image surfaces are not available for each line. Without those surfaces, the migrated images must be calculated on the sagittal planes of each line, thus introducing three dimensional inaccuracies which are overcome by the present technique.

Use of the migration method of the present invention has many advantages over prior methods, as will be apparent to those skilled in the art. It should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A method for determining the three dimensional structure of a subsurface region of the earth, said method involving seismic data acquired on a two dimensional grid of intersecting lines, said method comprising the steps of:

a) determining the three dimensional spatial reference of structural features corresponding to each of a plurality of said intersections by determining at least one three dimensional depth curve for each of said plurality of said intersections;

b) for each of a plurality of said lines, using said three dimensional depth curves corresponding to said intersections in said line to determine at least one three dimensional imaging surface; and c) determining said three dimensional structure of said subsurface region by performing three dimensional migration of said seismic data to said imaging surface.

2. The method of claim 1, wherein the determination of said three dimensional depth curves involves calculation of reflection time-dips.

3. The method of claim 2, wherein said reflection time-dips are used to derive three dimensional time-dip functions.

4. The method of claim 1, wherein the determination of said three dimensional depth curves involves inverse ray-tracing using a three dimensional velocity model.

5. The method of claim 1, further comprising the step of interpreting said migrated data using three dimensional visualization.

6. The method of claim 1, wherein the three dimensional migration involves prestack migration.

7. The method of claim 1, wherein the three dimensional migration involves poststack migration.

8. A method for determining the three dimensional structure of a subsurface region of the earth, said method involving seismic data acquired on a two dimensional grid of intersecting lines, said method comprising the steps of:

a) calculating reflection time-dips for each of a plurality of said intersections;

b) determining the three dimensional spatial reference of structural features corresponding to each of said plurality of said intersections by using said reflection time-dips to determine at least one three dimensional depth curve for each of said plurality of said intersections;

c) for each of a plurality of said lines, using said three dimensional depth curves corresponding to said intersections in said line to determine at least one three dimensional imaging surface; and d) determining said three dimensional structure of said subsurface region by performing three dimensional migration of said seismic data to said imaging surface.

9. The method of claim 8, wherein said reflection time-dips are used to derive three dimensional time-dip functions.

10. The method of claim 9, wherein the determination of said three dimensional depth curves involves inverse ray-tracing using a three dimensional velocity model.

11. The method of claim 8, further comprising the step of interpreting said data using three dimensional visualization.

12. The method of claim 8, wherein the three dimensional migration involves poststack migration.

13. The method of claim 8, wherein the three dimensional migration involves prestack migration.

14. A method for determining the three dimensional structure of a subsurface region of the earth, said method involving seismic data acquired on a two dimensional grid of intersecting lines, said method comprising the steps of:

a) determining at least one three dimensional reflection time-dip for each of a plurality of said intersections;

b) for each of said plurality of said intersections, using said reflection time dip to determine at least one three dimensional time-dip function;

c) determining the three dimensional spatial reference of structural features corresponding to each of said plurality of said intersections by performing three dimensional, inverse, zero offset ray tracing for each of said time-dip functions to determine at least one migrated depth curve for each of said plurality of said intersections;

d) for each of a plurality of said lines, using said three dimensional depth curves corresponding to said intersections in said line to determine at least one three dimensional imaging surface;

e) determining said three dimensional structure of said subsurface region by performing three dimensional migration of said seismic data to said imaging surface; and f) interpreting said structure using three dimensional visualization.

15. The method of claim 14 where the three dimensional migration involves prestack Kirchoff migration.

16. The method of claim 14 where the three dimensional migration involves poststack Kirchoff migration.

17. The method of claim 14 where the three dimensional migration involves three dimensional wave equation migration.

* * * * *